May 14, 1957
C. C. HALL
2,791,932
LIGHT RESPONSIVE APPARATUS FOR DETECTING
SUSPENDED MATTER IN A FLUID
Filed July 30, 1953
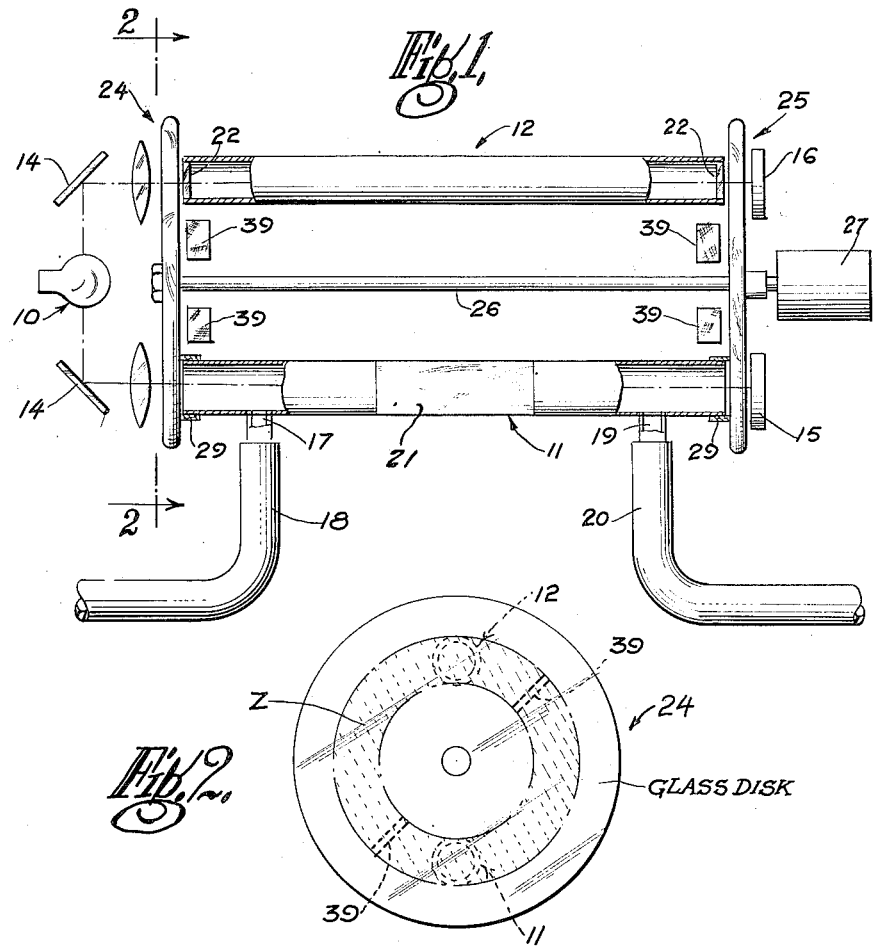
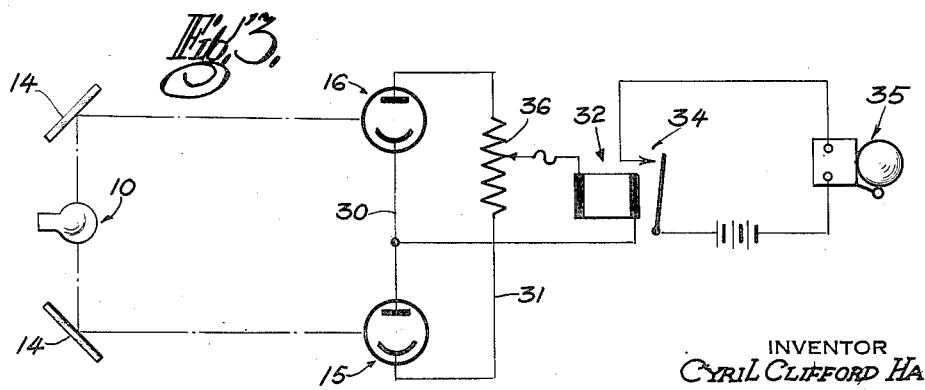
INVENTOR
*Cyril Clifford Hall*
BY
*J. William Carson*
ATTORNEY United States Patent Office 2,791,932
Patented May 14, 1957

2,791,932

LIGHT RESPONSIVE APPARATUS FOR DETECTING SUSPENDED MATTER IN A FLUID

Cyril Clifford Hall, Ealing, London, England, assignor to Specialties Development Corporation, Belleville, N. J., a corporation of New Jersey Application July 30, 1953, Serial No. 371,336

8 Claims. (Cl. 88—14)

The present invention relates to light responsive apparatus for detecting and/or indicating the presence of suspended matter in fluid, such as smoke or dust in air or other gaseous media, and, more particularly, to such apparatus for testing gaseous samples for smoke which contain condensable vapors.

It has been found that the oil and/or volatile contaminants thereof in the crankcase of diesel engines can form explosive mixtures which are ignited when the temperature of the oil approaches the flash point temperature of such mixtures, whereby an explosion results. Such explosions have been known to cause considerable damage, both to the engine and the surrounding structure, and to result in loss of life and personal injuries. Consequently, overheating of these explosive mixtures creates a hazardous condition in the operation of diesel engines.

Usually, the overheating of the oil and volatile contaminants in approaching the flash point temperature is preceded by considerable smokiness which, if detectable, could be utilized as an indication that a hazardous condition is in its creation.

While many types of light responsive apparatus have been successfully utilized in detecting smoke in air, such apparatus has been found to be inoperative where the air also contained condensable oil vapors such as found in crankcase samples and the like.

Accordingly, an object of the present invention is to provide light responsive apparatus for detecting smoke in gaseous samples containing condensable vapors.

Another object is to provide such apparatus which is reliable in operation and requires a minimum of maintenance and supervision.

A further object is to provide such apparatus which is simple and economical in construction.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing apparatus comprising, in combination, a comparison or balance tube, an open-ended sample tube having an inlet adjacent one end thereof and an outlet adjacent the other end thereof, means for circulating through the sample tube gaseous samples containing condensable vapors and in which suspended matter, such as smoke, is to be detected, means for directing a beam of light through each of the tubes from one end thereof, a balanced network including light sensitive means, such as photoelectric cells, adjacent the end of each of the tubes opposite the light beam end and electroresponsive means controlled by the light sensitive means, and translucent means intermediate the tubes and the light beam directing means and the tubes and intermediate the tubes and the light sensitive means upon which vapor in the samples is condensed to equally effect the beam directed through each of the tubes.

A preferred embodiment of the invention has been chosen for purposes of illustration and description, and is shown in the accompanying drawing, forming a part of the specification, wherein:

Fig. 1 is a schematic view illustrating apparatus in accordance with the present invention.

Fig. 2 is an end view taken along the line 2—2 on Fig. 1.

Fig. 3 is a wiring diagram illustrating a balanced network utilized in connection with the apparatus shown in Figs. 1 and 2.

Referring to the drawing in detail and more particularly to Fig. 1 thereof, apparatus is shown for testing air samples withdrawn from a space (not shown) wherein the air contains condensable vapors, for example, oil vapor found in the air space of a diesel engine crankcase.

The apparatus generally comprises a source of light such as an electric lamp 10, a sample tube 11, a comparison or balance tube 12 parallel to but spaced from the tube 11, mirrors 14 for directing a beam of light from the lamp through each of the tubes at one end thereof, and photoelectric cells 15 and 16 adjacent the other end of the tubes 11 and 12, respectively, upon which the light beam is directed.

The tube 11 is utilized for circulating therethrough gaseous samples to be tested to detect suspended matter such as smoke therein, and, for this purpose, has an inlet 17 adjacent one end thereof connected by a conduit 18 to the space from which the samples are withdrawn and has an outlet 19 adjacent the other end thereof connected by a conduit 20 to a suction fan or pump (not shown). The tube 11 is open at its ends because a transparent closure would fog up due to vapor in the samples condensing thereon. Preferably, the tube 11 has a transparent section 21 between the inlet and outlet thereof for visually detecting and/or observing suspended matter in the samples.

The tube 12 may be open at its ends, but, preferably, the ends are closed by transparent closures 22 which serve to seal a sample of clean air in the tube. If desired, the tube 12 may be evacuated or may contain any suitable gas or fluid through which the light beam is adapted to pass.

As shown in Figs. 1 and 2, transparent or translucent means are positioned closely adjacent the respective ends of the tubes 11 and 12. Such means may comprise a glass disc 24 at the light source end of the tubes, a glass disc 25 intermediate the other end of the tubes and the photoelectric cells 15 and 16, a rotatable shaft 26 parallel with respect to and intermediate the tubes 11 and 12 upon which the glass discs are mounted for rotation, and a motor 27 for effecting rotation of the shaft.

Preferably, the glass discs 24 and 25 are so close to the respective ends of the tube 11 that they serve in effect as closures for the open ends of the tube, whereby external air will not be drawn into the tube at its ends in appreciable amounts. If desired, a collar 29 of soft or yieldable material, such as felt or rubber may be mounted on the tube 11 at its ends. These collars lightly contact the glass discs and improve the effectiveness of the end seals.

In Fig. 3, a balanced network is shown wherein the anode of each photoelectric cell is connected to the cathode of the other cell by conductors 30 and 31, respectively, and a relay 32 or other current responsive device for operating a switch 34 adapted to control an alarm 35 is connected across the conductors 30 and 31. If desired, the relay may be connected at one side through a potentiometer 36 in the conductor 31 whereby adjustments can be made to more accurately balance the network when suspended matter is absent in the sample tube 11.

The photoelectric cells 15 and 16 are of the current generating type which are adapted to generate a current of a given value when a beam of light of a given intensity is directed thereon. Hence, by connecting the cells in opposed relationship, no current will flow through the relay when the light beams directed on the cells are of equal intensity. However, should the intensity of the beam directed on the sample tube cell 15 be diminished, due to suspended matter being present in the sample passing through this tube, the current generated by the cell 15 will be much less than that generated by the cell 16, whereby the network is unbalanced and current flows through the relay causing the same to be operated to close the switch 34 and effect actuation of the alarm 35.

In operation of the apparatus, a portion of the vapor in the samples condenses on the rotating glass discs 24 and 25 to gradually build up an annular band or zone Z (Fig. 2) of a uniform light absorbing value on the discs. The discs of course are rotated at a speed so that the variation in the light absorbing value of the condensate band in the course of one revolution is not perceptible. Since the amount of light absorbed by these bands from both of the light beams is equal, the current generated by each cell is equally diminished whereby the network remains in balance, so long as suspended matter is absent in the sample tube.

In view of the fact that the increase in the light absorbing value of the bands is very gradual, the apparatus can be operated without being attended for several days or more. However, it may be desirable to periodically wipe the discs clean one or more times a day so that the sensitivity of the network is not impaired beyond permissible limits. Such wiping may be performed manually or by a pair of automatic means 39 located at diametrically opposite points adjacent each disc and adapted to be moved into wiping contact with the discs by solenoid operated devices controlled by a time clock switch and/or a manually operable switch.

In the event the collars 29 are utilized, the discs are wiped thereby continuously to prevent the light absorbing value of the condensate bands from becoming excessive, while maintaining the light absorbing value of given portions of the band uniform as they pass the tubes 11 and 12.

From the foregoing description, it will be seen that the present invention provides apparatus capable of detecting suspended matter in gaseous samples containing condensable vapors, which apparatus is simple and economical in construction, practical and reliable in operation, and, if desired, is self-cleaning to thereby reduce supervision thereof to a minimum. The apparatus, while small in size, is sufficiently rugged to withstand continuous use without maintenance or repair.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In apparatus of the class described, the combination of a comparison tube, an open-ended sample tube having an inlet adjacent one end thereof and an outlet adjacent the other end thereof, means for circulating through said sample tube gaseous samples containing condensable vapors and in which suspended matter is to be detected, means for directing a beam of light through each of said tubes from one end thereof, a balanced network including light sensitive means adjacent the end of each of said tubes opposite said light beam end and electroresponsive means controlled by said light sensitive means, common translucent means intermediate said tubes and said light beam directing means and common translucent means intermediate said tubes and said light sensitive means upon which vapor is condensed to equally affect the beam directed through each of said tubes, said last mentioned means being closely adjacent said open-ended tube, and means for moving each of said last mentioned means in a plane perpendicular to the longitudinal axes of said tubes.

2. In apparatus of the class described, the combination of a pair of tubes, one of said tubes having open ends and an inlet adjacent one end thereof and an outlet adjacent the other end thereof, means for circulating through said open-ended tube gaseous samples containing condensable vapors and in which suspended matter is to be detected, means for directing a beam of light through each of said tubes from one end thereof, a balanced network including light sensitive means adjacent the end of each of said tubes opposite said light beam end and electroresponsive means controlled by said light sensitive means, a common translucent disc adjacent one end of said tubes and intermediate said ends of said tubes and said light beam directing means, a second common translucent disc adjacent the other end of said tubes and intermediate said ends of said tubes and said light sensitive means, said discs being closely adjacent said open tube to prevent the escape of vapors therefrom, and means for rotating each of said discs in a plane perpendicular to the longitudinal axes of said tubes, whereby vapor deposited on said discs will be distributed thereon in the form of an annular band adapted to equally affect the beam directed through each of said tubes.

3. In apparatus of the class described, the combination of a comparison tube having translucent closures at the ends thereof, a sample tube having open ends and an inlet adjacent one end thereof and an outlet adjacent the other end thereof, means for circulating through said sample tube gaseous samples containing condensable vapors and in which suspended matter is to be detected, means for directing a beam of light from a common source through each of said tubes from one end thereof, a balanced network including light sensitive means adjacent the other end of each of said tubes and electroresponsive means controlled by said light sensitive means, a common translucent disc adjacent one end of said tubes and intermediate said ends of said tubes and said light beam directing means, a second common translucent disc adjacent the other end of said tubes and intermediate said ends of said tubes and said light sensitive means, said discs being closely adjacent said open tube to prevent the escape of vapors therefrom, and means for rotating each of said discs in a plane perpendicular to the longitudinal axes of said tubes, whereby vapor deposited on said discs will be distributed thereon in the form of an annular band adapted to equally affect the beam directed through each of said tubes.

4. In apparatus of the class described, the combination of a pair of parallel tubes, one of said tubes having open ends and an inlet adjacent one end thereof and an outlet adjacent the other end thereof, means for circulating through said open-ended tube gaseous samples containing condensable vapors and in which suspended matter is to be detected, means for directing a beam of light from a common source through each of said tubes from one end thereof, a balanced network including light sensitive means adjacent the end of each of said tubes opposite said light beam end and electroresponsive means controlled by said light sensitive means, a shaft intermediate and parallel to said tubes, a translucent disc on said shaft adjacent one end of each of said tubes and intermediate said ends of said tubes and said light beam directing means, a second translucent disc on said shaft adjacent the other end of each of said tubes and intermediate said ends of said tubes and said light sensitive means, said discs being closely adjacent said open tube to prevent the escape of vapors therefrom, and means for rotating said shaft to rotate each of said discs in a plane perpendicular to the longitudinal axis of said tubes, whereby vapor deposited on said discs will be distributed thereon in the form of an annular band adapted to equally affect the beam directed through each of said tubes.

5. In apparatus of the class described, the combination of a comparison tube having translucent closures at the ends thereof, a sample tube parallel to said comparison tube having open ends and an inlet adjacent one end thereof and an outlet adjacent the other end thereof, means for circulating through said sample tube gaseous samples containing condensable vapors and in which suspended matter is to be detected, means for directing a beam of light from a common source through each of said tubes from one end thereof, a balanced network including a photocell adjacent the other end of each of said tubes and a relay controlled by said photocells, a shaft intermediate and parallel to said tubes, a translucent disc on said shaft closely adjacent one end of each of said tubes and intermediate said ends of said tubes and said light beam directing means, a common translucent disc on said shaft closely adjacent the other end of each of said tubes and intermediate said ends of said tubes and said photocells, and means for rotating said shaft to rotate each of said discs in a plane perpendicular to the longitudinal axis of said tubes, whereby vapor deposited on said discs will be distributed thereon in the form of an annular band adapted to equally diminish the intensity of the beam directed through each of said tubes.

6. In apparatus of the class described, the combination of a pair of tubes, one of said tubes having open ends and an inlet adjacent one end thereof and an outlet adjacent the other end thereof, means for circulating through said open-ended tube gaseous samples containing condensable vapors and in which suspended matter is to be detected, means for directing a beam of light through each of said tubes from one end thereof, a balanced network including light sensitive means adjacent the end of each of said tubes opposite said light beam end and electroresponsive means controlled by said light sensitive means, a common translucent disc adjacent one end of said tubes and intermediate said ends of said tubes and said light beam directing means, a second common translucent disc adjacent the other end of said tubes and intermediate said ends of said tubes and said light sensitive means, said discs being closely adjacent said open tube to prevent the escape of vapors therefrom, means for rotating each of said discs in a plane perpendicular to the longitudinal axes of said tubes, whereby vapor deposited on said discs will be distributed thereon in the form of an annular band adapted to equally affect the beam directed through each of said tubes, and means for wiping said discs to remove the vapor deposited thereon.

7. In apparatus of the class described, the combination of a pair of tubes, one of said tubes having open ends and an inlet adjacent one end thereof and an outlet adjacent the other end thereof, means for circulating through said open-ended tube gaseous samples containing condensable vapors and in which suspended matter is to be detected, means for directing a beam of light through each of said tubes from one end thereof, a balanced network including light sensitive means adjacent the end of each of said tubes opposite said light beam end and electroresponsive means controlled by said light sensitive means, a common translucent disc adjacent one end of said tubes and intermediate said ends of said tubes and said light beam directing means, a second common translucent disc adjacent the other end of said tubes and intermediate said ends of said tubes and said light sensitive means, said discs being closely adjacent said open tube to prevent the escape of vapors therefrom, means for rotating each of said discs in a plane perpendicular to the longitudinal axes of said tubes, whereby vapor deposited on said discs will be distributed thereon in the form of an annular band adapted to equally affect the beam directed through each of said tubes, and normally ineffective means for wiping said discs to remove the vapor deposited thereon adapted to be rendered effective periodically.

8. In apparatus of the class described, the combination of a comparison tube having translucent closures at the ends thereof, a sample tube having open ends and an inlet adjacent one end thereof and an outlet adjacent the other end thereof, means for circulating through said sample tube gaseous samples containing condensable vapors and in which suspended matter is to be detected, means for directing a beam of light from a common source through each of said tubes from one end thereof, a balanced network including light sensitive means adjacent the other end of each of said tubes and electroresponsive means controlled by said light sensitive means, a common translucent disc adjacent one end of said tubes and intermediate said ends of said tubes and said light beam directing means, a second common translucent disc adjacent the other end of said tubes and intermediate said ends of said tubes and said light sensitive means, said discs being closely adjacent said open tube to prevent the ecape of vapors therefrom, means for rotating each of said discs in a plane perpendicular to the longitudinal axes of said tubes, whereby vapor deposited on said discs will be distributed thereon in the form of an annular band adapted to equally affect the beam directed through each of said tubes, and means forming a seal between said discs and the ends of said sample tube.

References Cited in the file of this patent

UNITED STATES PATENTS

| 2,278,920 | Evans et al. | Apr. 7, 1942 |

FOREIGN PATENTS

| 368,941 | Great Britain | Mar. 17, 1932 |
| 788,111 | France | July 22, 1935 |